United States Patent [19]

Kupf et al.

[11] 4,045,350
[45] Aug. 30, 1977

[54] FILTER ASSEMBLY MADE OF THERMOPLASTIC MATERIALS

[75] Inventors: Lubomir Kupf, Prague; Mirko Mursec, Pardubice, both of Czechoslovakia

[73] Assignee: Statni Vyzkumny Ustav Materialu, Prague, Czechoslovakia

[21] Appl. No.: 560,109

[22] Filed: Mar. 19, 1975

[51] Int. Cl.$^2$ .................... B01D 39/14; C02C 1/22
[52] U.S. Cl. .................... 210/232; 55/483; 55/492; 55/495; 55/507; 55/DIG. 31; 210/445; 210/486
[58] Field of Search .............. 210/231, 227–230, 210/445, 232, 486; 55/DIG. 31, 482, 483, 490, 492, 493, 495, 496, 497, 379, 507, 378

[56] References Cited

U.S. PATENT DOCUMENTS

| | | | |
|---|---|---|---|
| 2,594,518 | 4/1952 | Teale | 210/231 |
| 3,221,883 | 12/1965 | Lennstrom | 210/231 |
| 3,241,678 | 3/1966 | Wrotnowski | 210/228 |
| 3,497,065 | 2/1970 | Johnson | 210/231 |

OTHER PUBLICATIONS

Modern Plastics Encyclopedia, 1968, vol. 45, No. 1A, pp. 344–366.

Encyclopedia of Polymer Science and Technology, vol. 3, Interscience Publishers, 1968, pp. 80–109.

*Primary Examiner*—Frank W. Lutter
*Assistant Examiner*—Frank Sever
*Attorney, Agent, or Firm*—Burgess, Ryan and Wayne

[57] ABSTRACT

A filter assembly includes a monolithic thermoplastic structural element having parallel sealing surfaces, the element being either a filter frame or a filter support. The material of the element is denser at its surface than in its inner portions. When the element is a filter support, it has a system of filter grooves extending in its surfaces, which may be connected to a discharge outlet by way of a further groove which has a dimension increasing toward the discharge. When the element is a filter frame, it may be provided with a support body in the sludge space, having bases parallel with the sealing surfaces of the element. One or more inlet ports to the sludge space of the frame are provided, which flare outwardly toward the sludge space. The element may be provided with oval or circular recesses extending from edges between the parallel sealing surfaces, and the element may be provided with a projection on its edge, to which a holder may be affixed. If the element is a filter support, two edge corners may be bevelled and provided with projections to enable a filter sheet to be held thereto by way of clips on the projections.

7 Claims, 8 Drawing Figures

FILTER ASSEMBLY MADE OF THERMOPLASTIC MATERIALS

The present invention relates to a filter assembly made of thermoplastic materials, such as, for example, polypropylene, polyethylene or polyurethane, or the like, which assembly comprises a filter support, a filtering sheet and a filter frame. To obtain a solid portion from the suspension to be filtered, as particularly in filter press plants, the filter assembly consists of filter press frames, while if used in clearing processes, it comprises filtering sheets and cloths only.

As known, heretofore used filter supports and filter frames have been manufactured from wood and metal. In the latter case the metallic surface has been protected with an organic coating, such as of rubber or a thermoplastic material. Recently, they have been introduced filtering assemblies made from thermoplastic material, such as, or instance, polyethylene, polypropylene, or the like, by pressure moulding or chip working.

Needless to say that such technological processes are rather time-consuming, tedious and quite expensive. Consequently, such a technology substantially influences the construction proper of both the filter supports and frames, which construction is in turn limited in performance of said supports and frames, by properties of the respective materials used. Apart from this, the filter supports are heavy and the manipulation thereof a tiresome operation. Due to some dificulties in the manufacture, certain final construction finishings that should be made on such filter supports and filter frames are sometimes unfeasible. Further the process of manufacturing such filter supports and filter frames is complicated and consequently very expensive.

Holders for the filter supports and filter frames are usually made from structurally complicated metal castings which are relatively heavy and laborious in manufacture. In filter presses they are fastened to the filter support or filter frame by means of bolts. The holder is provided with a roller to roll upon guide rails of the filter press. Although existing holders made from thermoplastic materials are not as heavy as metallic ones, they are complicated from the structural point of view, since the improvement thereof consists substantially only in the omission of the roller. However, the construction thereof requires a plurality of additional parts, such as, for example, bolts, screws, anticorrosion caps for screw heads, and the like. The fastening of the filter supports by means of bolts further requires a corresponding thickness of said supports, which negatively affects the filter press output.

The filtering sheets of cloths must hereunto have been prevented from being shifted, since in this case apertures designed to convey the suspension to be filtered along the overall length of the filter press, may have gotten choked. The fixing of the filtering sheet has heretofore been accomplished by pinning it on points extending from the upper horizontal surface of the filter support or by providing the filtering sheet with circular holes to be engaged by mating pegs extending from said surface. Both said modes of fixing tend to shorten the lifetime of the filtering sheet, since such holes cause the sheet to gradually be torn. Apart from this, the filtering sheets become tucked in operation, e.g. in the form of undesirable undulations or folds.

In view of their shape, construction and relatively high weight, the existing filter frames and filter supports makes the mechanization of filtering processes difficult, as for instance the opening of filter presses.

In processing easily filterable suspensions, it may be advisable to use filter frames having a considerable thickness of about 50 mm or even more. Because of the existing construction of filter frames and filter supports made from thermoplastic materials, filter frames have not yet been manufactured in such sizes, since an excessive thickness tends to considerably extend the cooling periods and consequently raises the manufacturing costs above reasonable economical limits.

In operation, the filling of the filter press is completed after the operative space of the filter frames has been completely filled up with the solid phase of the suspension, which latter completely fills up not only said space of the frame but also its intake ports. After the filter press has been opened said ports have to be laboriously cleaned by raking, in order to prevent, during the subsequent feeding of the filter press, the rise of differential pressures upon the filtering sheets, due to the lack of suspension infeed into some of the frames.

During the filter press filling and particularly in the next operation of washing or blowing through, respectively, a pressure gradient occurs in the interior of the filter press which exposes the filter supports to unilateral stress which causes them to bulge out or sometimes even to degrade.

Since the sealing or bearing surfaces of the filter assemblies are planar, it is necessary to exert a considerable thrust, to provide for sufficient specific pressure values.

In the operative spaces of the filter frames a solid pasty deposit is left from the filtered suspensions this deposit has to be laboriously scraped from the lower horizontal surface of filter frame.

Likewise the manufacture of filtering sheets to be used to clairce refining purposes is very time-consuming and laborious, and requires the use of relatively rare materials, especially aluminium, which makes it economically disadvantageous. With regard to the technology of processing various materials used, such as, for instance, wood, aluminium, stainless steel as well as the respective finishes such as rubber or thermoplast coating, or the like, the structural possibilities of the existing filtering sheets are also unfavourably influenced. Moreover even a slight damage of the protective organic coating tends to impair the quality of cleared liquors, particularly beverages.

The existing constructions and material of the filtering sheets also unfavourably influence the filtering process proper and consequently the output of the filter assembly. In this respect it is especially the choking of the channels or ducts with the material from the damaged filtering sheet that is concerned. Apart from this, such a filtering sheet has a relatively short lifetime, particularly in the case of paper or cellulosic films.

When summarizing, it may be stated that, because of the materials used, the various technologies of manufacturing filtering sheets known as yet are excessively time-consuming and therefore expensive.

In order to eliminate or at least mitigate the drawbacks of prior art as hereinbefore set forth the present invention provides a filter assembly made from thermoplastic materials and designed to be used both in filter press and clearing plants, comprising filter supports, filtering sheets and filter frames, embodied as monolithic units, the filter supports being provided on their operative surfaces with a system of grooves and the filter frames being formed with a frame body and at least one intake port. In the filter assembly according to the invention the material of superficial layers of the filter supports and of the filter frames has a higher density than the material of their inner portions. The material of the filter supports and that of the filter frames contains preferably from 0.1 to b 75 percent be weight of inorganic fillers, such as, for example, glass beads, fibrous particles, or the like. In accordance with another feature of the invention the filter frames designed for filter presses are provided with oval or circular relieving recesses disposed between sealing or bearing surfaces of the filter frame or of the filter support, respectively. The filter frame has a lower inner wall which is slanted or has a roof-like shape. The intake ports of the filter frames for filter presses are flared towards a sludge space provided in the filter frame. The filter support and the filter frame for the filter presses, respectively, are provided on their outer surfaces with at least one coupling projection fixedly attached to a holder. The holder together with the filter support or with the filter frame, respectively, forms a monolithic unit.

According to another feature of the invention, at two bevelled corners of the top part of the filter support for filter presses there are provided clamping projections adapted to be engaged by clips for affixing filtering sheets to said supports. The middle part of the sludge space of the filter frame for filter presses is provided with a cylindrical or prismatic support body made of thermoplastic material, the bases of said body being parallel with the filter support upon the middle part of which they bear. In accordance with another preferable constructional embodiment of the present invention, a dovetail notch extends from an outlet duct of the filter support, in which notch a fitting is mounted. The filter support of the filter assemblies designed to be used in clearing plants is provided in the discharge region of a connecting channel with radial grooves for supplying and withdrawing the filtrate, these grooves are deepened in cross-section towards said connecting channel.

The filter assembly according to the present invention, when compared with the heretofore existing ones, possesses many merits of which the essential are particularly the rigidity of filter supports and frames, respectively. The relatively small thickness and a very low weight of the afore-mentioned elements enable an easy manual maintenance of the plants where they are installed, and, on the other hand, make it possible to solve more easily some constructional problems encountered in automation of filtering plants as well as to substantially reduce the weight thereof. Needless to say, in this manner a considerable enhancement of the productivity of even the existing filtering plants can be attained. The disclosed filter assembly has an excellent resistance to deleterious attacks of chemicals, which resistance may multiply the life of the whole plant. Further the maintenance thereof is less laborious and tiresome. The monolithic construction of both the supports and frames made from a thermoplastic material or materials obviates the use of metallic joining parts, such as bolts, which are prone to be exposed to corrosive effects of some reactive media. Apart from this, the construction of the filter supports and filter frames according to the invention enables the use of additional devices designed to prevent the filtering sheets or cloths from being pulled out of the sealing space even in case of relatively high filtering pressures. Also the removal of filter cakes out of frames is facilitated here. In comparison with the well-known supports and frames of filter presses, the present disclosure precludes the rather time-consuming adjustment of the filter assembly to prevent the leakage thereof, and consequently the necessity of a tiresome process of washing it through, which process, with well-known wooden supports and frames, has required as much as several day's down-time per month.

In contradistinction to well-known filter supports made of thermoplastic materials, the filter support according to the invention has substantially lower specific gravity. This favourably influences the manipulatability thereof as well as provides the possibility of taking advantage of a simple structural arrangement thereof, which with the known machined or worked assemblies, is not feasible. While the manufacture of the afore-mentioned filter assemblies has required a plurality of special machines and operations, the filter supports and frames according to the invention are practically made in a single manufacturing step. This is why the costs expended on the manufacture of the filter assemblies according to the invention constitute only a fraction of those necessary for the manufacture of the existing ones.

The filter supports or frames relieved by means of oval or circular recesses make it possible to cope with the problems of large-diameter filter constructions without endangering a reliable performance thereof, and under economically favourable conditions of the manufacture thereof. When compared with the existing filter supports and frames, including the well-known constructions made of thermoplastic materials, the filter assembly according to the present invention provides a better structural solution, irrespective of substantially lower manufacturing costs. Furthermore the slanted or roof-like shape of the lower inner wall portion of filter frame enables filter cakes to be more easily removed from the sludge space. Likewise the flaring of the intake ports towards the sludge space ensures a perfect falling-out of the pasty substance, which contributes to the reliable operation of the whole filter press without risking the rise of differential pressures provoking unilateral stress or even the damage or breakdown of the filter supports. In operation, it has been shown that the intake ports need not be cleaned by the operator by means of an appropriate tool so that conditions for a reliable automation of the filtering process are established. The coupling projections provided on the filter supports and frames have a completely firm attachment thereof to the holder, which attachment is preferably done by welding. This precludes the necessity of using any joining elements which constitute, even if considering the application of stainless steel in exacting plants, merely a provisional solution of the problem. The monolithic construction of both the filter supports and frames together with the holders reduces the number of the desired structural parts and consequently the manufacturing costs. From the viewpoint of wear of the holder it may be advisable to use exchangeable covers disposed on the spacer lug of the lower holder portion and on the bottom wall thereof. The exchangeable covers are adapted to maintain the constant position of the filter supports and frames in the assembly and can be easily replaced, if necessary. For fixedly attaching the filtering sheets or cloths it is preferable to arrange coupling projections at upper corners of the filter support, these projections are designed to be engaged by appropriate clips to affix the filtering sheets. In this manner any distortion of the filtering sheet is prevented and the adjustment thereof can be simultaneously effected more precisely and within a shorter time. Contrary to the wellknown constructions, the invention obviates the necessity of providing auxiliary clamping cutouts in the filtering sheet, or any inaccuracy in mounting the filtering sheet onto the points extending from the filter supports. A critical situation arising upon penetration of any undesirable contaminants into the suspension to be filtered, which may give rise to the afore-mentioned differential pressures, can be coped with by providing the filter frame with a support body situated in the middle of the sludge space. The close and firm connection of a fitting to the filter support by means of a dovetail notch makes the use of any other either metallic or thermoplastic joining member unnecessary. The radial grooves provided in the active surfaces of the filter supports designed to be used in clairce refining plants constitute, due to their cross-section flaring towards to the connecting channel and to their radial orientation, the most convenient solution both the filtrate intake and output problem.

In order that the present invention be better understood and carried into practice some preferred embodiments thereof will be hereinafter described with reference to the accompanying somewhat schematic drawings which, however, are not intended to limit in any way the invention scope. In the drawings.

Figure 1:
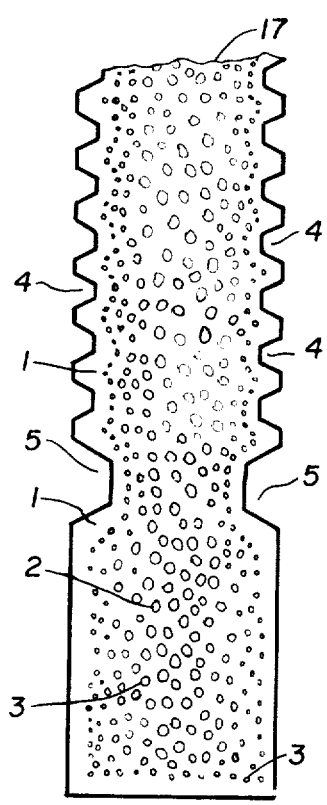
FIG. 1 is a fragmentary sectional view of a filtering sheet made of a single piece of material.

Referring now to the drawings, and particularly FIG. 1 thereof, it can be seen that a rectangular filter support 17 according to the invention is provided on both its active surfaces with a system of continuous spaced apart grooves 4 designed to withdraw a filtrate; said system is ended by a circumferential collecting groove 5. While the overall construction of the filter support 17 is of a monolithic character, the density of its superficial layers 1 and that of the inner portion 2 thereof are different from each other; the surface layers 1 are more homogeneous that the relieved inner portion 2. The surface layer 1 of the filter support 17 made from polypropylene has a higher density (approaching that of a homogeneous structure) than the inner portion 2 thereof, the density of inner portion 2 should preferbly be 60 percent lower that that of the former. Within this inner portion 2 the thermoplastic material contains a filling substance 3, such as, for example, glass beads or discrete inorganic fibrous particles uniformly distributed within the whole cross-section of said inner portion 2 of the filter support 17. The material of said inner portion 2 simulates roughly the surface shape of the filter support 17.

The filter supports 17 and filter frames 18 (see also FIGS. 3 and 4) as illustrated in preferred embodiments of the construction according to the invention and designed to be used, for instance, for filter press plants, are manufactured on an injection moulding machine for processing thermoplastic materials. A hopper thereof is supplied with a granulated polymeric material, such as, for example, polypropylene, preferably intermixed with e.g. 0.6 percent of a blowing agent such as diazocarbonamide. In the lowermost portion of the hopper of the injection moulding machine, the granulates are continuously mixed with 40 percent by weight of glass beads. The mixture is then melted in the machine cylinder, homogenized and the melt is finally injected at a high velocity into a precooled mould. Once cooled, the product in the form of a filter support 17 or a filter frame 18, respectively, designed to be used for filter presses, is taken out of the mould. The resultant possess all the above constructional details.

Figure 2:
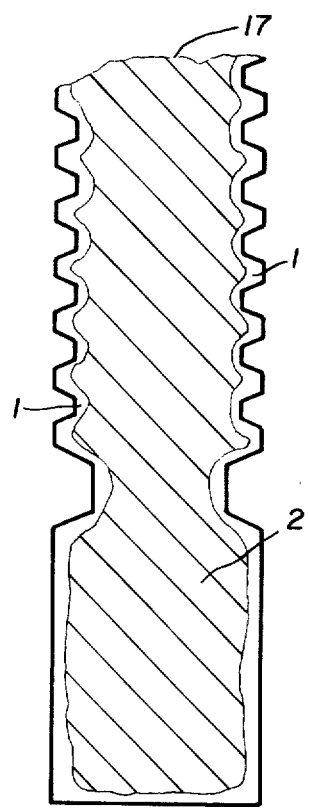
FIG. 2 is a similar fragmentary sectional view showing a filtering sheet made of a bicomponent material and provided with a homogeneous surface layer.

According to another embodiment of the invention shown in FIG. 2, the surface layer 1 of the filter support is made from homopolymerized ethylene whereas its inner portion 2 is relieved by means of a blowing agent. The surface layer 1 constitutes 15 percent of the inner portion volume. The more homogeneous surface layer 1 having a higher density than the inner portion 2 of the filter support 17, is connected to the said portion 2 along cross-sectional contours roughly simulating the surface shape of the support.

In this case the filter support 17 and the filter frames 18, respectively, are manufactured in such a manner that polyethylene melt, without any blowing agent, is injected, e.g. in a portion corresponding to 15 percent of the capacity of mould cavity whereupon the mould is fed with another 60 percent of the melt having one percent blowing agent content. Alternatively, the blowing agent containing mass can be constituted by another polymer type. After the melt feed, the last-mentioned blowing agent containing polymer dose will expand and build a relieved structure fixedly attached to the homogeneous superficial layer 1 of the filter support 17.

Figure 3:
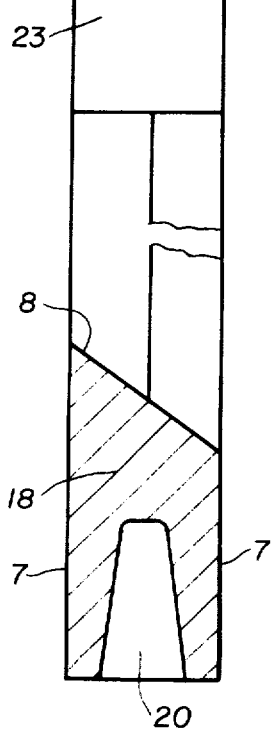
FIG. 3 is a fragmentary sectional view of a filter frame showing a slanted lower inner wall and a central support body thereof.

FIG. 3 shows a filter frame 18 of which lower inner wall is slanted at an angle of 30° while between sealing or bearing surfaces 7 thereof is provided a relieving oval recess 20 which has in cross-section a Vee form converging towards the frame centre. In the middle of the sludge space of the filter frame 18 a support body 23 is situated.

Figure 4:
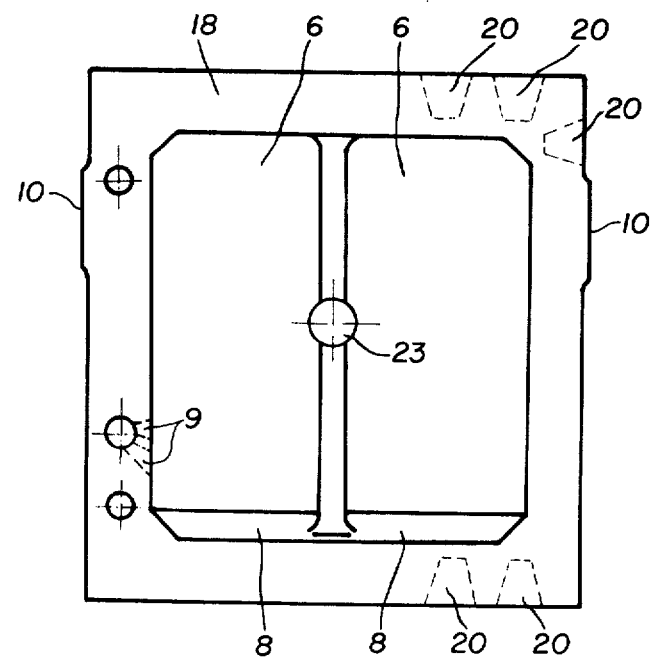
FIG. 4 is a top view of a filter frame provided with coupling projections designed for a holder with intake ports and a relieving recess.

As shown in FIG. 4, the filter frame 18 is formed on its outer vertical opposite sides with coupling projections 10, and along the circumference with the relieving recesses 20. From a central port there radially extend intake ports 9 flared conically towards the sludge space. In the middle of said sludge space there is provided the support body 23 having the same thickness as the filter frame 18. The bases of the support body 23 are adapted to bear against the middle parts of filter supports 17 arranged at the sides of the frame 18 to form a composite filter assembly, with the bases of the body 23 being parallel to the filter support 17.

Figure 5:
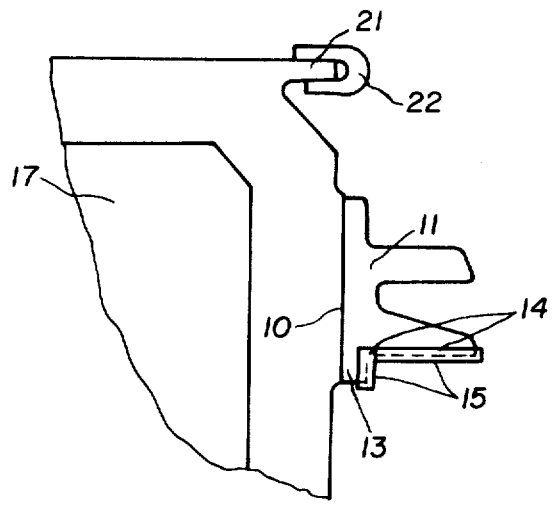
FIG. 5 is a fragmentary view of a holder together with strip covers, affixed to the filter support.
Figure 6:
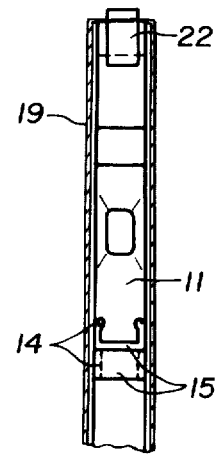
FIG. 6 is a lateral view of a holder affixed to the filter support.

To the coupling projection 10 of the filter support 17 (FIG. 5) a holder 11 is secured, preferably by butt-welding. In its bottom wall the holder 11 is provided with two dovetail grooves 14 perpendicular to each other and adapted to receive protective strip covers 15. In its top end part the filter support 17 is provided with a coupling projection 21 adapted to be engaged by a clip 22 to affix a filtering sheet (not shown).

The filter support 17 with the filtering sheet 19 affixed thereto by means of the clip 22 forms together with the holder 11 a monolithic unit. In the dovetail grooves 14 provided in the body of the holder 11 itself and in its spacer lug 13 there are arranged the strip covers 15 preferably made from polyformaldehyde.

Figure 7:
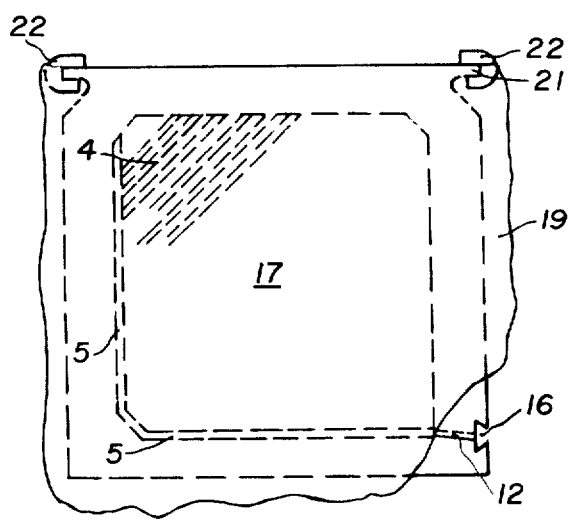
FIG. 7 is a bottom view of a filter support provided with a dovetail notch and a clamping projection designed to be engaged by a clip for fastening the filtering sheets.
Figure 8:
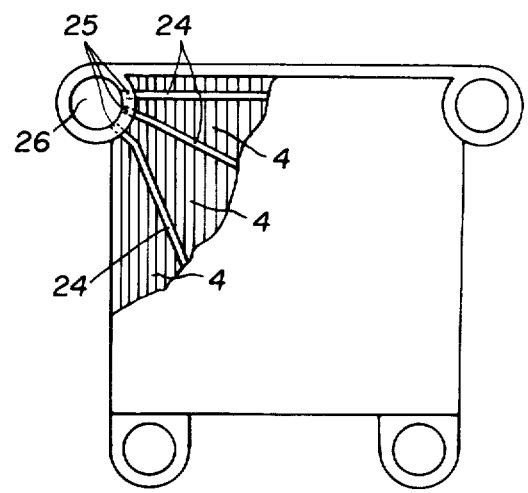
FIG. 8 is a top view of a filtering sheet to be used as a part of clearing plants, having radial grooves discharging into communication ducts.

The filter support 17 together with the filtering sheet 19 and the clips 22 (FIG. 7) is provided in its bottom righthand corner with an outlet duct 12 for withdrawing the filtrate, which duct discharges into a dovetail notch 16 serving as mounting means for a fitting, preferably a valve, without any additional fastening element. Each of the two slanted opposed sides of the dovetail notch 16 are preferably formed in the shape of a frustoconical segment.

The filter support 17 designed to be used for clearing plants is provided in its top lefthand corner with a communication duct 26 into which connecting channels 25 discharge. Into the connecting channel 25 radial grooves 24 for withdrawing the filtrate open in turn. As already hereinabove set forth, the active surface of the filter support 17 is provided with a system of grooves 4.

The filter assembly as described, by way of example, in some preferable embodiments, is made of a monolithic material, such as, for instance, polypropylene, which is relieved during the manufacture thereof in the mould while simultaneously shaped to form the construction according to the invention. In this way a construction unit with a high efficiency in operation is provided.

The filter assemblies made of relieved thermoplastic materials are preferably manufactured by using injection moulding techniques. The polymeric material to be processed, such as polypropylene, can contain the respective blowing agent, as e.g. in the amount of 0.6 percent by weight, or, optionally, other types of blowing agents, such as, for example, fine glass beads, or, alternatively, said components can be supplied together with the polymeric granulates directly into the injection moulding machine. The melt produced in the machine is conveyed at a relatively high velocity into a precooled mould while the desired weight of the product is controlled by the dose amount, apart from the blowing agent percentage.

The holders 11 for the filter supports 17 and the filter frames 18 are manufactured on injection moulding machines in separate moulds, or, alternatively, simultaneously with said support and frame, respectively. In the first-mentioned case the same technology is applied as in the process of manufacturing said supports and frames, the attachment being carried out by butt-welding with aid of a butt-welding machine.

What is claimed is:

1. In a filter assembly having filter support and filter frame elements, the improvement which comprises the elements of:

A monolithic filter support of expanded thermoplastic, the extended surfaces of said filter support being of greater density than the interior thereof to provide a structure of relative high strength and low weight; said filter support comprising as an integrated element of its monolithic structure, an upper edge which extends over two upper beveled corners of said filter support to form clamping projection means which function to hold a filter element means on said filter support in cooperation with independent clip means; said elements cooperatively functioning to facilitate adjustment of said filter element means during the operation of said assembly.

2. The filter assembly of claim 1 further comprising filter support and filter frame elements having two side edges which are provided with coupling projections extending therefrom for engaging said holder.

3. The filter assembly of claim 1 wherein the thermoplastic is selected from a group consisting of polyethylene, polypropylene and polyurethane.

4. The filter assembly of claim 1 wherein said filter support has an outlet duct extending to the edge of said filter support and a dovetail notch in said filter support at the end of said duct to receive a fitting for connection to said filter assembly.

5. The filter assembly of claim 4 having filter support and filter frame elements the improvement which comprises a filter support having an outlet duct extending to the edge of said filter support and a dovetail notch in said filter support at the end of said duct to receive a fitting for connection to said filter assembly.

6. The filter assembly of claim 1 useful for clarice refining wherein said filter support is provided with a discharge channel, a system of grooves in said filter support and an intersecting groove which intersects said system of grooves and extends to said channel, said intersecting groove having a variable cross section which increases toward said channel.

7. The filter assembly of claim 1 for clarice refining having filter support and filter frame elements the improvement which comprises providing said filter support with a discharge channel, a system of grooves in said filter support and an intersecting groove which intersects said system of grooves and extends to said channel said intersecting groove having a variable cross section which increases toward said channel.

* * * * *